(12) United States Patent
Takagi

(10) Patent No.: US 8,824,856 B2
(45) Date of Patent: Sep. 2, 2014

(54) MOVING IMAGE PROCESSING APPARATUS, MOVING IMAGE PROCESSING METHOD, AND PROGRAM

(75) Inventor: Yoshinori Takagi, Kanagawa (JP)

(73) Assignee: Sony Corporation, Tokyo (JP)

( * ) Notice: Subject to any disclaimer, the term of this patent is extended or adjusted under 35 U.S.C. 154(b) by 62 days.

(21) Appl. No.: 13/365,610

(22) Filed: Feb. 3, 2012

(65) Prior Publication Data

US 2012/0201506 A1 Aug. 9, 2012

(30) Foreign Application Priority Data

Feb. 8, 2011 (JP) ................................ 2011-024867

(51) Int. Cl.
*H04N 5/932* (2006.01)

(52) U.S. Cl.
USPC .......................................... 386/219; 386/200

(58) Field of Classification Search
None
See application file for complete search history.

(56) References Cited

U.S. PATENT DOCUMENTS

2010/0166259 A1* 7/2010 Otsu et al. ...................... 382/103
2010/0278419 A1* 11/2010 Suzuki ........................... 382/155

FOREIGN PATENT DOCUMENTS

JP 2007-164298 6/2007

* cited by examiner

*Primary Examiner* — William C Vaughn, Jr.
*Assistant Examiner* — Eileen Adams
(74) *Attorney, Agent, or Firm* — Frommer Lawrence & Haug LLP; William S. Frommer

(57) ABSTRACT

A moving image display processing apparatus, method and system is disclosed for displaying a moving image having frames and including additional information related to the moving image. The additional information is a plurality of representative frames from the moving image, each representative frame being a still image representing a group of sequential frames, and an implicative image associated with at least one frame in the group of sequential frames other than the representative frame. The representative frames are displayed in a predetermined sequence such that implicative images are displayed between the representative frames. The moving image and the additional information can be received from different information providers and the additional information may be available for use for a predetermined period of time.

15 Claims, 17 Drawing Sheets

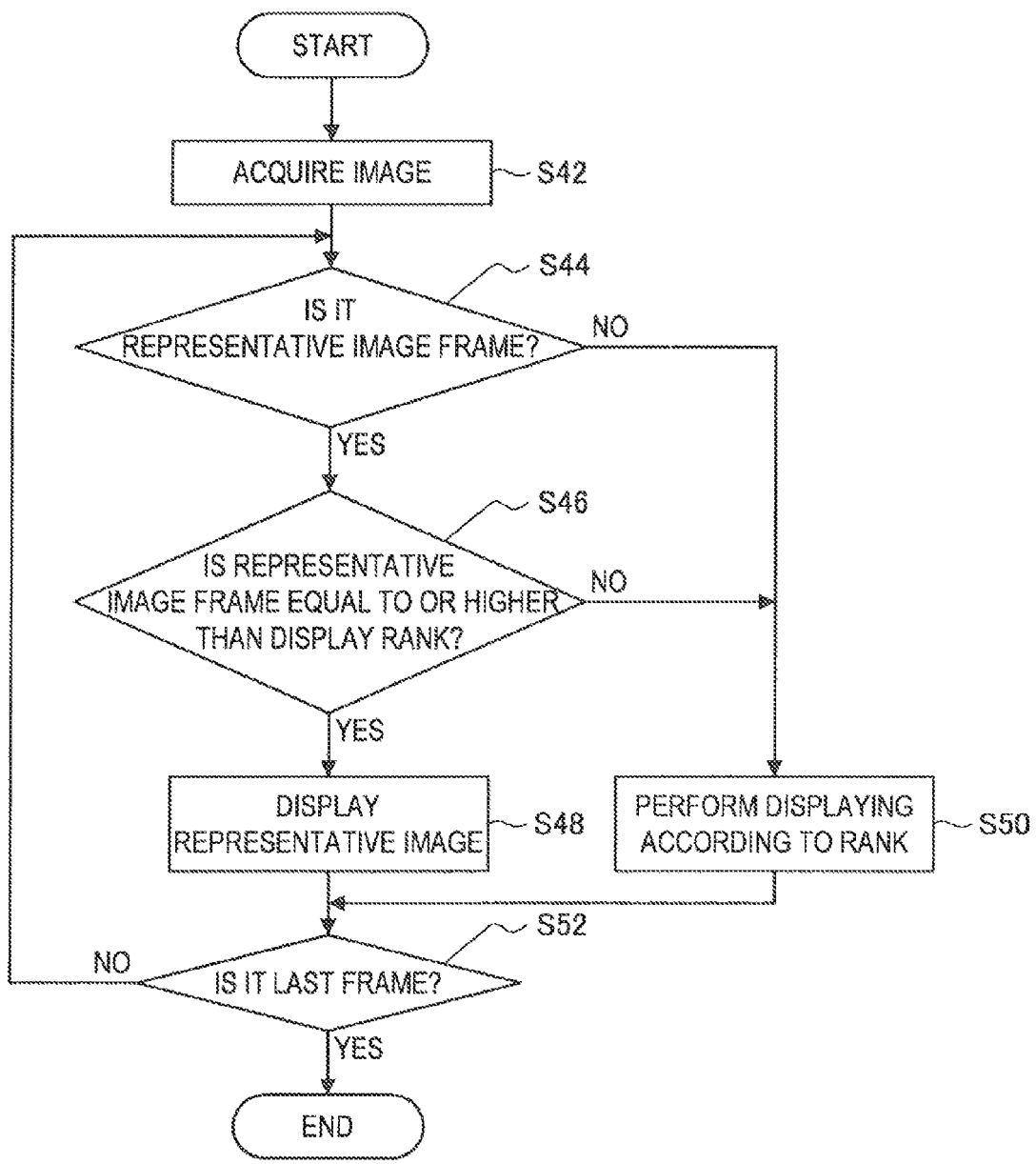

MOVING IMAGE PROCESSING APPARATUS, MOVING IMAGE PROCESSING METHOD, AND PROGRAM

BACKGROUND

The present disclosure relates to a moving image processing apparatus, a moving image processing method, and a program.

Recently, there has been a disclosed technique for acquiring a moving image (that is, contents) regarding music, video, or the like from an external server or the like via a network or the like and reproducing the content designated by a user.

A moving image is configured to include a plurality of frames (still images). For example, at the time of searching for a moving image, one frame (image) representing the moving image is displayed as a thumbnail image (refer to Japanese Patent Application Laid-Open No. 2007-164298).

SUMMARY

However, since only one frame (representative frame) is displayed as a thumbnail image, there is an issue that only the fragmentary information on the moving image is displayed and the contents of the moving image are not appropriately checked.

In light of the foregoing, it is desirable to provide a moving image processing apparatus, a moving image processing method, and a program which allows a user to appropriately check contents of a moving image when representative frames of the moving image are displayed.

An apparatus, method and non-transitory computer-readable medium for a moving image display processor includes a frame selection unit configured to select a plurality of representative frames from a moving image comprised of frames, each representative frame being a still image representing a group of sequential frames. A generation unit is configured to generate one or more implicative images associated with at least one frame in the group of sequential frames other than the representative frame. A display control unit is configured to display the plurality of representative frames by arranging the plurality of representative frames in a predetermined sequence such that a first representative frame is separated from a second representative frame by one or more implicative images.

In some embodiments of the moving image display processor, each representative image has an associated hierarchical order. The display unit displays selected representative images at or above a specified hierarchical order and the display unit does not display the representative images below the specified hierarchical order. Implicative images include representative images below the specified hierarchical order and implicative images between selected representative images.

Another implementation of the disclosure is a moving image display system in which a non-transitory storage medium having stored thereon a moving image comprised of frames. A display control unit is configured to display the moving image on a display. A representative image selector is configured to receive additional information associated with the moving image and not stored on the non-transitory storage medium, and cause the display control unit to display the received associated information.

In some embodiments of the system, the additional information is a plurality of representative frames from the moving image, each representative frame being a still image representing a group of sequential frames, and an implicative image associated with at least one frame in the group of sequential frames other than the representative frame. Displaying the additional information includes displaying a plurality of representative frames in a predetermined sequence such that implicative images are displayed between a first representative frame and a second representative frame.

In some embodiments of the disclosure, the received additional information is available for display on the display unit for a predetermined period of time.

Yet another implementation of the disclosure is a moving image display system includes a non-transitory storage medium having stored thereon (i) a moving image comprised of frames, (ii) a plurality of representative frames from the moving image, each representative frame being a still image representing a group of sequential frames, and (iii) an implicative image associated with at least one frame in the group of sequential frames other than the representative frame. A display control unit is configured to display the moving image. A representative image selector is configured to receive a control signal and in response to cause the display control unit to display a plurality of representative frames in a predetermined sequence such that a first representative frame is separated from a second representative frame by a display of implicative image.

According to the present disclosure described above, it is possible to allow a user to appropriately check the contents of a moving image when representative frames of the moving image are displayed.

BRIEF DESCRIPTION OF THE DRAWINGS

FIG. 20 is a flowchart for explaining an example of operations of the moving image processing apparatus according to the second embodiment.

DETAILED DESCRIPTION OF THE EMBODIMENTS

Figure 1:
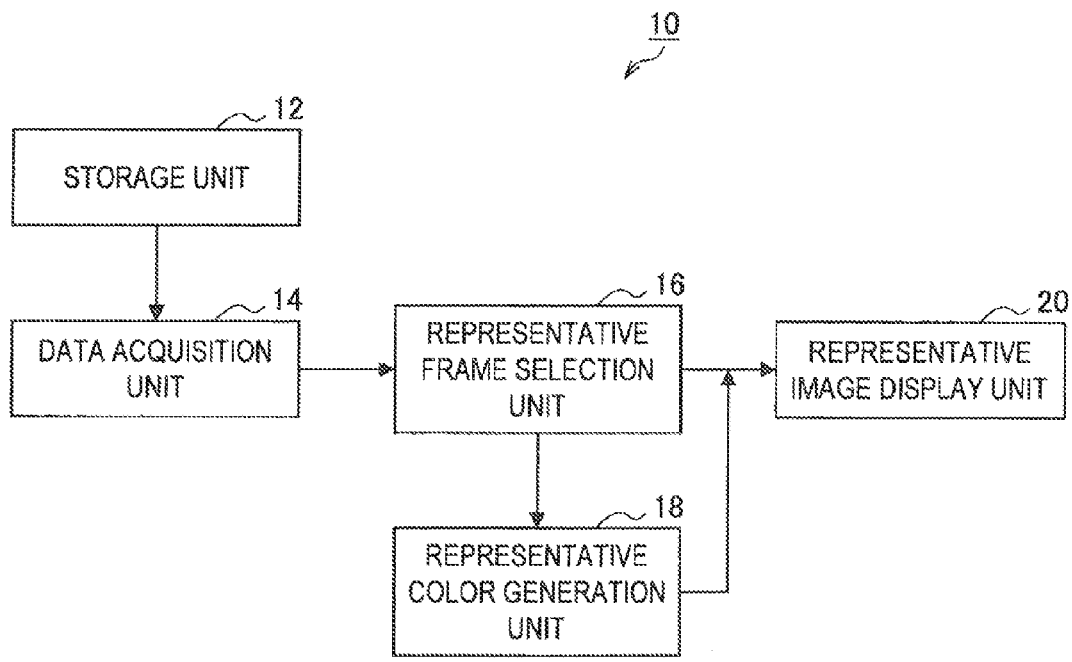
FIG. 1 is a block diagram illustrating a configuration of a moving image processing apparatus according to a first embodiment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, descriptions will be made in the following order.

1. First Embodiment
  1-1. Configuration of the Moving Image Processing Apparatus According to the First Embodiment
  1-2. Displaying Representative Frames and Implicative Images
  1-3. Operations of the Moving Image Processing Apparatus According to the First Embodiment
  1-4. Modified Example
  1-5. Conclusions
2. Second Embodiment
  2-1. Configuration of the Moving Image Processing Apparatus According to the Second Embodiment
  2-2. Hierarchical Display of Representative Images
  2-3. Operations of the Moving Image Processing Apparatus According to the Second Embodiment
  2-4. Conclusions
3. Other Embodiments

1. First Embodiment

1-1. Configuration of the Moving Image Processing Apparatus According to the First Embodiment An example of the configuration of a moving image processing apparatus 10 according to a first embodiment will be described with reference to FIG. 1. FIG. 1 is a block diagram illustrating the configuration of the moving image processing apparatus 10 according to the first embodiment.

The moving image processing apparatus 10 includes a storage unit 12, a data acquisition unit 14, a representative frame selection unit (hereinafter, referred to as a frame selection unit) 16, a frame representative feature generation unit (also referred to herein as a representative color generation unit) 18, and a representative image display unit 20. In addition, the representative feature generation unit 18 corresponds to an implicative image generation unit, and the representative image display unit 20 corresponds to a display controller.

The storage unit 12 stores reproducible moving image data. For example, the storage unit 12 stores moving image data which are downloaded from an external server or the like via a network or the like. Herein, the moving image data is image data in a frame format. In other words, the moving image data is configured by a frame group, that is, a group of frames which are still images. In addition, the moving image data may be a combination of image data and audio data. The storage unit 12 also stores program data or the like which is used for a process of displaying a thumbnail image (hereinafter, referred to as a representative image) of the moving image or a process of reproducing the moving image.

The data acquisition unit 14 acquires the moving image data stored in the storage unit 12 and outputs the moving image data to the frame selection unit 16. The data acquisition unit 14 may also acquire moving image data from an external apparatus as well as the moving image data stored in the storage unit 12.

The frame selection unit 16 selects a plurality of representative frames representing the moving image from the frame group constituting the moving image. Herein, the number of frames selected as the representative frames is not constant, but it may be different according to the moving image. For example, as described later in detail, the frame selection unit 16 selects a plurality of the frames of which the interval is equal in the configuring order of the frame group as the representative frames. However, the present disclosure is not limited thereto, but the frame selection unit 16 may also select a plurality of the frames of which the interval is not equal in the configuring order of the frame group, as the representative frames.

The representative feature generation unit 18 generates an implicative image implying a representative feature of the frame image with respect to each of non-selected frames which are not selected as the representative frames among the frame group constituting the moving image. Herein, the representative feature denotes an aspect of the frame image that can be used to characterize the entire frame image. For example, the representative feature can be a color such as a background color which is used for most portions of an image. A user may predict which frame image exists by identifying the representative color.

The representative image display unit 20 displays a representative image representing the moving image on the display screen. The representative image display unit 20 performs the display by arranging the plurality of the representative frames selected by the frame selection unit 16 as the representative image of one moving image. The representative image display unit 20 displays the plurality of the representative frames in a predetermined arrangement direction in the state where the representative frames are separated from each other (refer to FIG. 2).

In addition, when the representative image display unit 20 displays the representative image, the representative image display unit 20 also displays the implicative images, which are generated by the representative feature generation unit 18, so as to be adjacent to the representative frames. As described later in detail, the representative image display unit 20 displays an implicative image, which corresponds to a non-selected frame located between two representative frames in the configuring order of the frame group, between the two representative frames in the arrangement direction (refer to FIG. 2).

Herein, the implicative image denotes a segment image indicated by a segment. As described later in detail, the representative image display unit 20 displays the segment images corresponding to each of the plurality of the non-selected frames to be adjacent to the representative frames by arranging the segment images in the configuring order of the frame group of the plurality of the non-selected frames (refer to FIG. 4). In addition, when the representative image display unit 20 displays the plurality of the representative frames, the representative image display unit 20 may perform the display in such a manner that the number of the segment images adjacent to one representative frame is different from the number of the segment images adjacent to a different representative frame (refer to FIG. 5).

In the configuration described above, the data acquisition unit 14, the frame selection unit 16, the representative feature generation unit 18, and the representative image display unit 20 are constructed with a calculation processing unit such as a CPU. The storage unit 12 is constructed with an internal storage unit such as a flash memory or an external storage unit such as a hard disk drive. The CPU embodies a moving image processing method by executing a program read from a ROM or the like.

1-2. Displaying Representative Frames and Implicative Images

Figure 2:
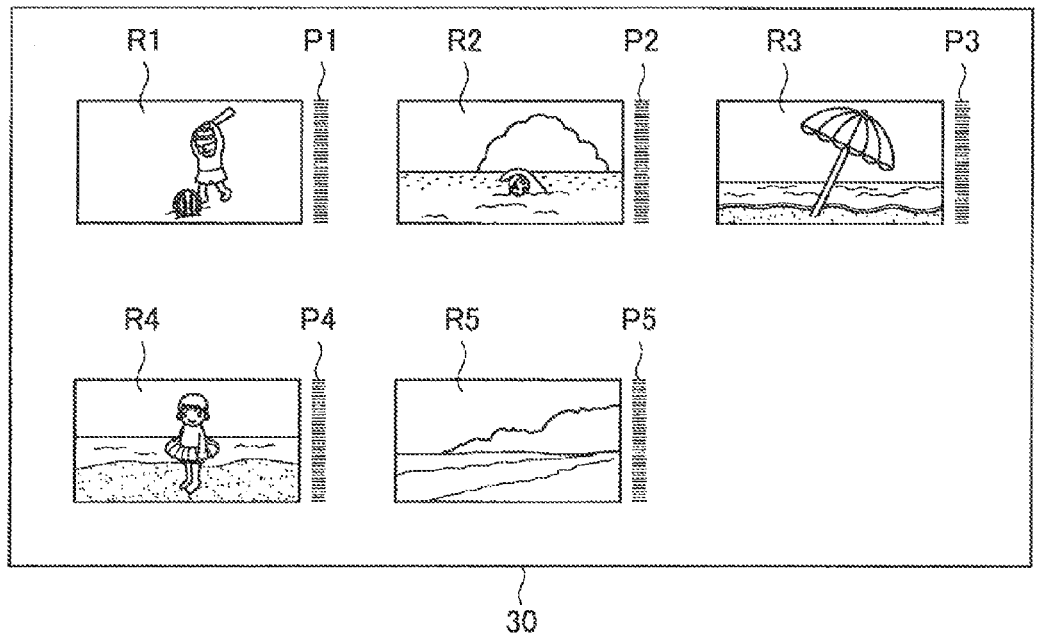
FIG. 2 is a diagram illustrating an example of displaying a plurality of representative frames and a plurality of implicative images.

A display example of displaying the representative frames and the implicative images as the representative image of the moving image will be described with reference to FIG. 2. FIG. 2 is a diagram illustrating an example of displaying a plurality of the representative frames and a plurality of the implicative images. On the display screen 30 in FIG. 2, illustrated are five representative frames R1 to R5 and implicative images P1 to P5 adjacent to the representative frames.

The moving image processing apparatus 10 according to the first embodiment performs the display by arranging the plurality of the representative frames with respect to the data of one moving image on the display screen 30. The representative frames are extracted from the frame group constituting the moving image data. The arrangement order of the plurality of the representative frames depends on the configuring order of the frame. In addition, the number of the representative frames displayed varies with the moving image data.

In addition, the moving image processing apparatus 10 displays the implicative images P1 to P5 at the position adjacent to the representative frames R1 to R5. The implicative images are images implying the feature or color information or the like of frames (non-selected frames) other than the representative frames in the moving image data and are displayed between the representative frames. Details of the implicative image will be described later.

In addition, in FIG. 2, although the representative frames of one moving image are displayed on the display screen 30, representative frames of a plurality of moving images may be displayed. In this case, the plurality of the representative frames are displayed with respect to each of the moving images. Therefore, for example, if the display screen 30 is applied as the search screen for searching for a desired moving image among a plurality of the moving images, the content of each moving image may be checked, so that a user may select the desired moving image without viewing each of the moving images.

Hereinafter, for the convenience of description, the overview of a flow of displaying a plurality of the representative frames and a plurality of the implicative images from the data of one moving image will be described.

Figure 3:
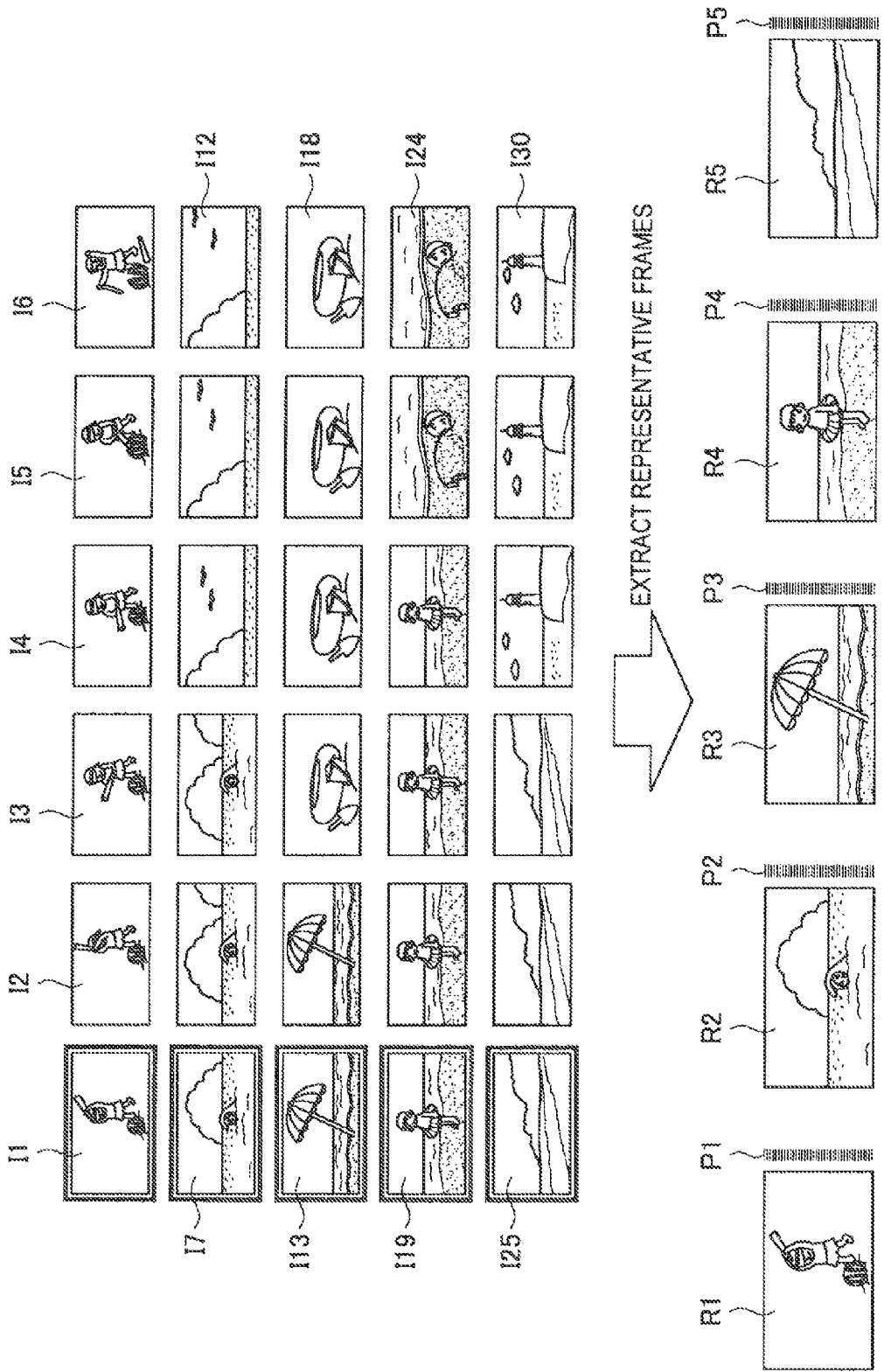
FIG. 3 is a diagram for explaining an example of extraction of a plurality of representative frames from the data of one moving image.

FIG. 3 is a diagram for explaining an example of extraction of a plurality of representative frames from the data of one moving image. Herein, for the convenience of description, the data of one moving image is configured to include 30 frames (in an actual case, configured to include a larger number of frames). In FIG. 3, the first frame I1, the seventh frame I7, the 13th frame I13, the 19th frame I19, and the 25th frame I25 are selected as the representative frames R1 to R5. In other words, the frames having a constant interval in the frame group are selected as the representative frames.

The non-selected frames, which are not selected as representative frames among the 30 frames constituting the moving image, are displayed as the implicative images. The frames I2 to I6, the frames I8 to I12, the frames I14 to I18, the frames I20 to I24, and the frames I26 to I30 are displayed as the implicative image P1, the implicative image P2, the implicative image P3, the implicative image P4, and the implicative image P5, respectively. These implicative images allow a user to infer which frames exist between the representative frames.

Figure 4:
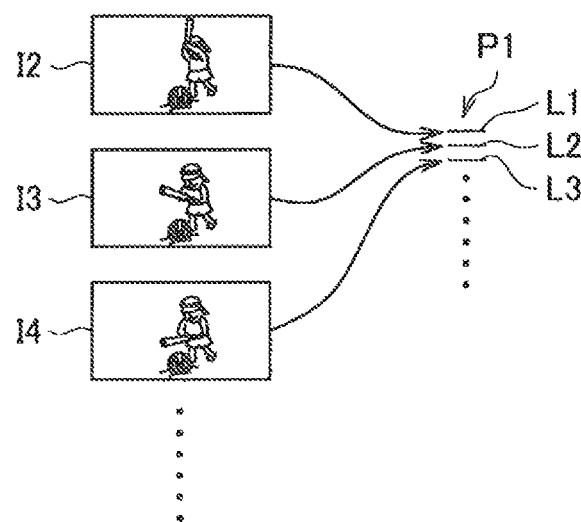
FIG. 4 is a diagram for explaining the configuration of an implicative image.

Herein, a configuration of the implicative image is described with reference to FIG. 4. FIG. 4 is a diagram for explaining the configuration of the implicative image. Since the five implicative images P1 to P5 have the same configuration, the description is made by exemplifying the implicative image P1 herein. The implicative image P1 is configured with a plurality of segment images L1, L2, and L3. In other words, each of the implicative images having a rectangular shape illustrated in FIG. 3 denotes a set of plural segments. In addition, although the number of the segment images constituting the implicative image P1 is six in correspondence to the frames I2 to I6, for the convenience of description, the number of the segment images is illustrated to be large in FIG. 3 (this description is the same with respect to the implicative images P2 to P5). Each segment image indicates the representative color, for example, of the image of the corresponding non-selected frame. For example, the segment image L1 indicates the representative color of the image of the frame I1, and the segment image L2 indicates the representative color of the image of the frame I2.

In addition, although the segment images are exemplified as an implicative image, the present disclosure is not limited thereto. For example, the implicative image may be a size-reduced image of a frame (image which is much smaller than a representative frame) or an image which is illustrated by a shape other than a line. In addition, although the implicative image is configured to an image indicating the color information of the frame image, the present disclosure is not limited thereto. For example, the implicative image may be an image indicating the luminance information of the frame image.

Figure 5:
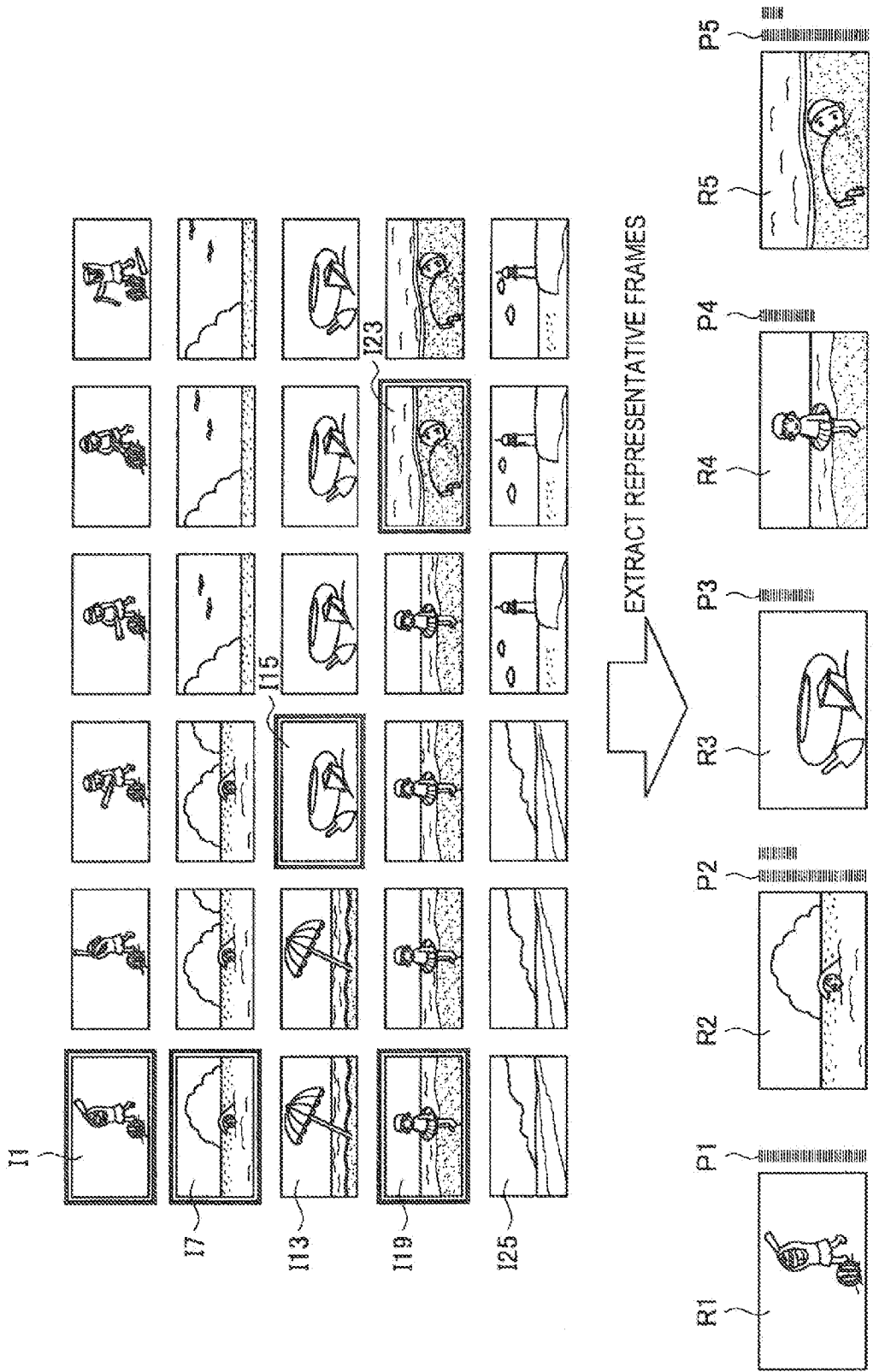
FIG. 5 is a diagram for explaining an example of extraction of a plurality of representative frames from the data of one moving image.

In FIG. 3 described above, although the non-selected frames of which the interval is constant in the frame group are configured to be selected as representative frames, the present disclosure is not limited thereto. As illustrated in FIG. 5, non-selected frames of which the interval is not constant may be configured to be selected. FIG. 5 is a diagram for explaining an example of the extraction of a plurality of representative frames from the data of one moving image.

In FIG. 5, the first frame I1, the seventh frame I7, the 15th frame I15, the 19th frame I19, and the 23rd frame I23 are selected as the representative frames R1 to R5. On the other hand, the frames I2 to I6, the frames I8 to I14, the frames I16 to I18, the frames I20 to I23, and the frames I24 to I30 are displayed as the implicative image P1, the implicative image P2, the implicative image P3, the implicative image P4, and the implicative image P5, respectively. Since the numbers of the frames constituting the implicative images are different, the lengths of the five implicative images P1 to P5 are also not constant. In other words, the lengths of the implicative images P3 and P4 are small (the number of the segment images constituting the implicative image is small); and the lengths of the implicative images P2 and P5 are large (the number of the segment images constituting the implicative image is large). Therefore, the implicative image may also imply the number of the frames (or an elapsing time) existing between the representative frames.

In addition, in FIG. 4 described above, one segment image is generated as the image indicating the representative color of the image of one frame, but the present disclosure is not limited thereto. For example, as illustrated in FIG. 6, an image of one frame may be divided into a plurality of areas, and segment images corresponding to the areas may be generated.

Figure 6:
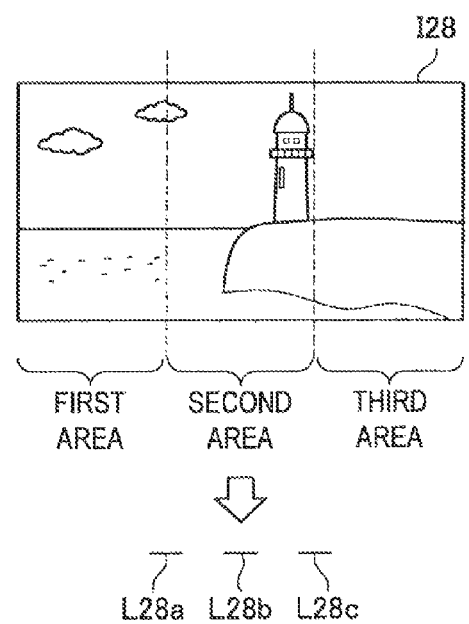
FIG. 6 is a diagram illustrating a plurality of segment images generated with respect to one frame.

FIG. 6 is a diagram illustrating a plurality of the segment images generated with respect to one frame. In FIG. 6, it is assumed that an image of one frame is divided into three areas (first, second, and third areas). However, the number of divisions with respect to the frame is not limited to three. For example, the number of divisions may be two or four or more. With respect to the divided areas, segment images are generated. More specifically, a first segment image L28a, a second segment image L28b, and a third segment image L28c are generated with respect to the first area, the second area, and the third area, respectively. In FIG. 6, since the images included in the three areas are different, the colors indicated by the three segment images L28a, L28b, and L28c are different.

Figure 7:
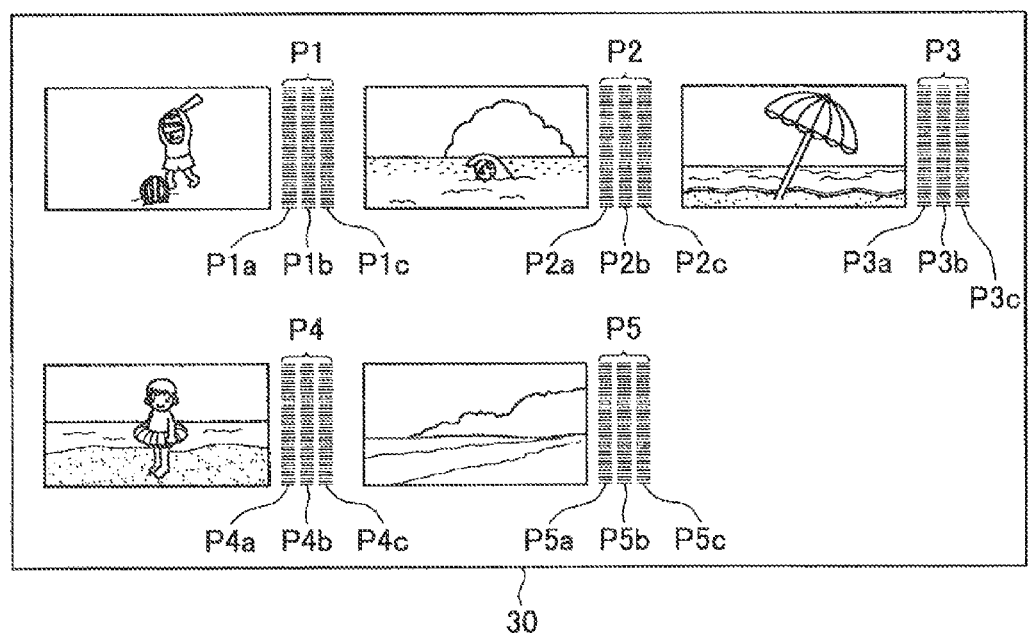
FIG. 7 is a diagram illustrating an example of displaying a plurality of representative frames and a plurality of implicative images.

An example of displaying implicative images including three segment images generated is described with reference to FIG. 7. FIG. 7 is a diagram illustrating an example of displaying a plurality of representative frames and a plurality of implicative images. The difference from the display example illustrated in FIG. 2 is that each of implicative images P1 to P5 includes three implicative portions. For example, the implicative image P1 includes a first implicative portion P1a, a second implicative portion P1b, and a third implicative portion P1c. The first implicative portion P1a is a group of the first segment images (first segment image of FIG. 6) of each frame; the second implicative portion P1b is a group of the second segment images of each frame; and the third implicative portion P1c is a group of the third segment images of each frame. In this manner, display is performed by using a plurality of the implicative portions, so that it is possible to more finely display color information of images of the non-selected frames.

Figure 8:
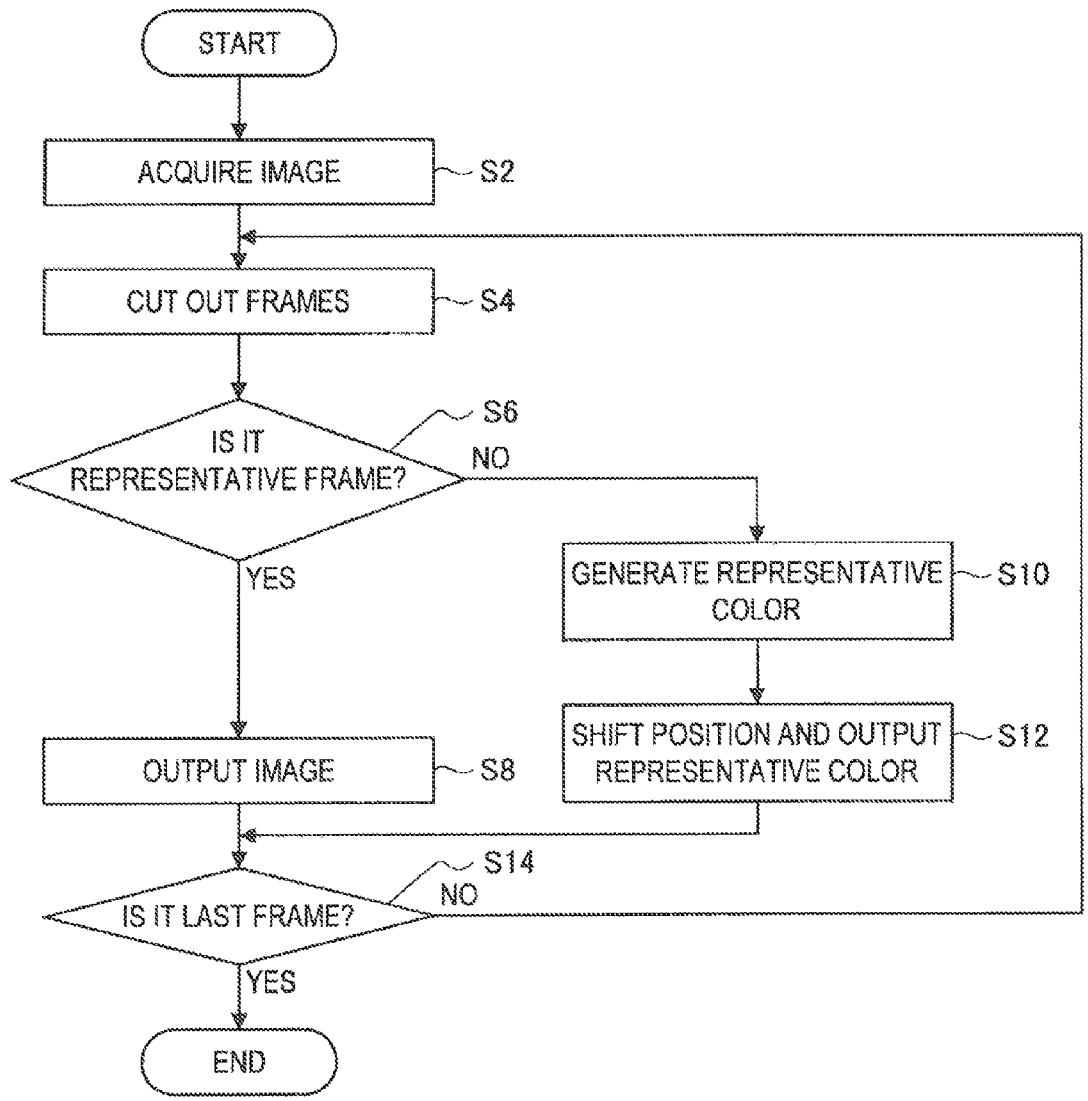
FIG. 8 is a flowchart for explaining an example of operations of the moving image processing apparatus according to the first embodiment.

1-3. Operations of the Moving Image Processing Apparatus According to the First Embodiment Next, an example of operations (moving image processing method) of the moving image processing apparatus 10, which is performed at the time of displaying the representative frames and implicative images, is described with reference to FIG. 8. FIG. 8 is a flowchart for explaining an example of operations of the moving image processing apparatus 10 according to the first embodiment. The flowchart of FIG. 8 starts, for example, as a search screen for searching for a moving image is accessed.

First, the data acquisition unit 14 acquires moving image data (Step S2). For example, the data acquisition unit 14 acquires to-be-reproduced moving image data from the storage unit 12.

The frame selection unit 16 cuts frames out from the acquired moving image data (Step S4). In other words, the frame selection unit 16 cuts out the first frame of the frame group constituting the moving image data.

Next, the frame selection unit 16 determines whether or not the cut frame is a representative frame (Step 6). In the case where the cut frame is a representative frame (Yes in Step S6), the frame selection unit 16 transmits the cut frame to the representative image display unit 20. The representative image display unit 20 displays the received representative frame (Step S8). In addition, the representative image display unit 20 displays the representative frame as reduced in scale.

On the other hand, in the case where the cut frame is not a representative frame (No in Step S6), the frame selection unit 16 transmits the cut frame to the representative feature generation unit 18. As illustrated in FIG. 4, the representative feature generation unit 18 generates the representative feature (implicative image) of the image of the received frame (Step S10). The representative feature generation unit 18 transmits the generated representative feature to the representative image display unit 20. The representative image display unit 20 displays the received representative feature (Step S12).

Next, the frame selection unit 16 determines whether or not the cut frame is the last frame of the moving image data (Step S14). In the case where the cut frame is the last frame (Yes in Step S14), the process is ended. On the other hand, in the case where the cut frame is not the last frame (No in Step S14), the aforementioned Steps S4 to S12 are repeated. Accordingly, as illustrated in FIG. 2 or FIG. 7, the plurality of the representative frames and the plurality of the implicative images are displayed as the representative images of one moving image on the display screen 30.

In addition, in the above description, although the displaying process (the moving image processing method) of the representative frames and the implicative images of one moving image is described, in the case where there are a plurality of the moving images, the aforementioned processes (Steps S2 to S14) are repeated. In other words, when the number of moving images of which the representative images are to be displayed is increased, the display screen (search screen) is updated. Therefore, a user may select a desired moving image based on a plurality of representative frames and a plurality of implicative images corresponding to each of the moving images displayed on the search screen.

1-4. Modified Example

Figure 9:
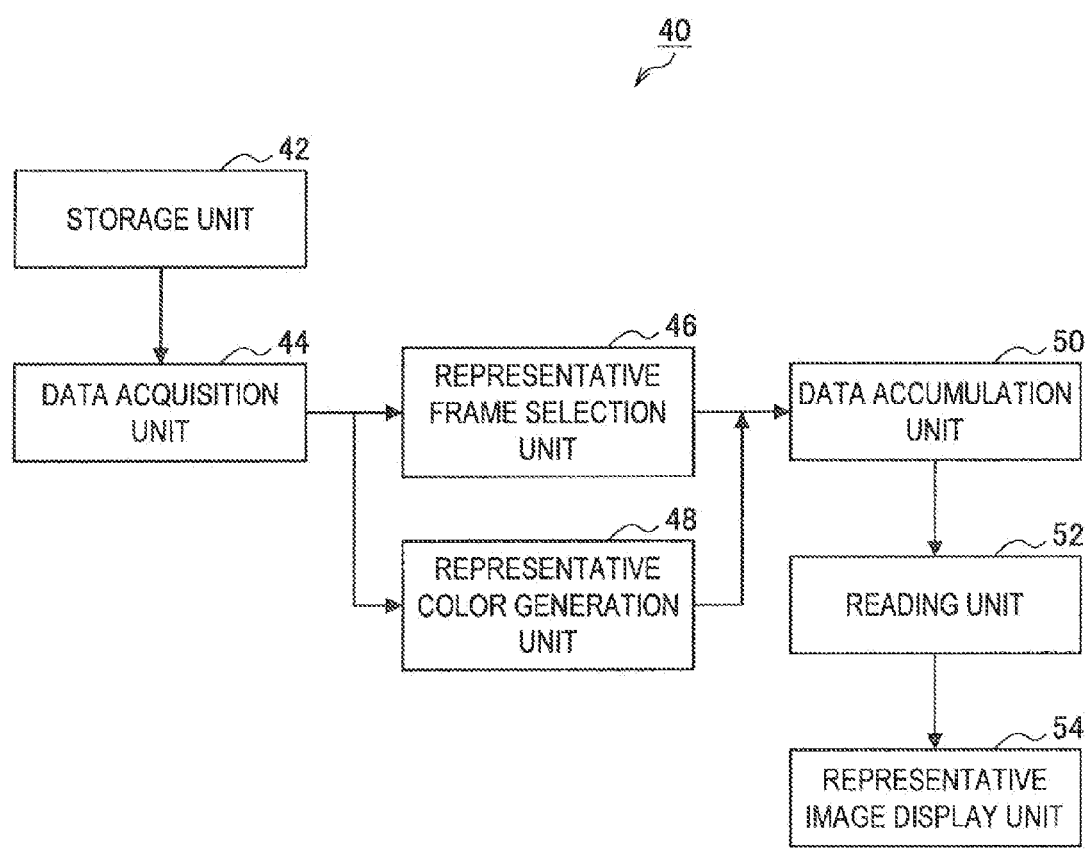
FIG. 9 is a block diagram illustrating the configuration of a moving image processing apparatus according to a modified example.

An example of a configuration of a moving image processing apparatus 40 according to a modified example is described with reference to FIG. 9. FIG. 9 is a block diagram illustrating a configuration of the moving image processing apparatus 40 according to the modified example.

In the aforementioned moving image processing apparatus 10, a plurality of the representative frames and a plurality of the implicative images are configured to be displayed on the display screen immediately after the representative features (implicative images) of the frames other than the representative frames are generated. On the contrary, in the moving image processing apparatus 40, the information on the representative frames and the representative features are stored temporarily, and after that, the representative frames and the representative features (e.g., colors) are displayed if necessary.

As illustrated in FIG. 9, the moving image processing apparatus 40 includes a storage unit 42, a data acquisition unit 44, a frame selection unit 46, a representative feature generation unit 48, a data accumulation unit 50, a reading unit 52, and a representative image display unit 54.

The storage unit 42, the data acquisition unit 44, the frame selection unit 46, and the representative feature generation unit 48 are the same as the storage unit 12, the data acquisition unit 14, the frame selection unit 16, and the representative feature generation unit 18 illustrated in FIG. 1, respectively. Therefore, a detailed description of the configuration thereof is not repeated.

The data accumulation unit 50 stores information on the representative frames selected by the frame selection unit 16 and the implicative images of the frames generated by the representative feature generation unit 48. In other words, the moving image processing apparatus 40 temporarily stores the information on the representative frames or the implicative images of the moving image data without immediately displaying the representative frames of the acquired moving image data.

If the reading unit 52 receives a display command of displaying the representative frames of the moving image data, which is issued by a user, the reading unit 52 reads data (information on the representative frames or the implicative image of the moving image data) stored in the data accumulation unit 50 and transmits the data to the representative image display unit 54.

As illustrated in FIG. 2, the representative image display unit 54 displays a plurality of the representative frames and a plurality of the implicative images on the display screen 30 based on the data transmitted from the reading unit 52. In addition, the display performed by the representative image display unit 54 is the same as that of the representative image display unit 20 in FIG. 1.

Figure 10:
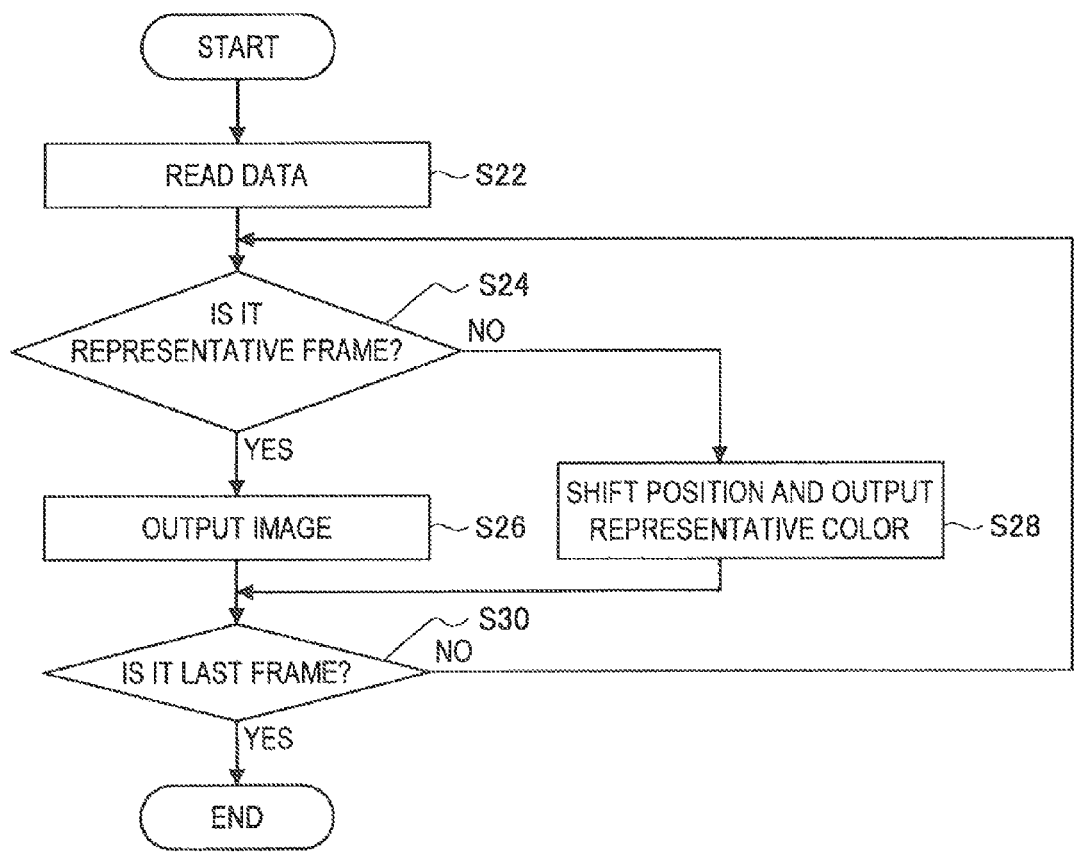
FIG. 10 is a flowchart for explaining an example of operations of a moving image processing apparatus according to a modified example.

Next, an example of the operations of the moving image processing apparatus 40, which is performed at the time of displaying the representative frames and the implicative images, is described with reference to FIG. 10. FIG. 10 is a flowchart for explaining an example of operations of the moving image processing apparatus 40 according to the modified example. The flowchart of FIG. 10 starts with the representative frames of the moving image already selected and the representative features of the non-selected frames of the moving image already generated.

First, the reading unit 52 reads moving image data (information on the representative frames or the implicative images of the moving image data) stored in the data accumulation unit 50 (Step S22) and transmits the moving image data to the representative image display unit 54.

The representative image display unit 54 sequentially reads the frames of the frame group constituting the moving image data received and controls the display. More specifically, in the case where the read frame is a representative frame (Yes in Step S24), the representative image display unit 54 displays the representative frame (Step S26). On the other hand, in the case where the read frame is not a representative frame (No in Step S24), the representative image display unit 54 displays the representative feature of the image of the frame (Step S28).

Next, the representative image display unit 54 determines whether or not the read frame is the last frame of the moving image data (Step S30). In the case where the read frame is the last frame (Yes in Step S30), the process is ended. On the other hand, in the case where the read frame is not the last frame (No in Step S30), the aforementioned Steps S24 to S28 are repeated. Accordingly, as illustrated in FIG. 2 or FIG. 7, a plurality of the representative frames and a plurality of the implicative images are displayed as the representative images of one moving image on the display screen.

1-5. Conclusions

According to the first embodiment, a plurality of the representative frames are displayed as the representative images of one moving image, and the implicative images (segment images indicating the representative features, such as colors, of the images) are generated and displayed with respect to the non-selected frames other than the representative frames. Therefore, since it is possible to display much more information of the moving image on the display screen, a user may easily check the contents of the moving image.

In addition, the implicative images of the non-selected frames are displayed so that it is not necessary to intentionally view the frames other than the representative frames. Therefore, the checking load to the user may be reduced so that it is possible to increase the number of images or the image amount which the user may view in the same time interval. Furthermore, a plurality of the representative frames are displayed so that it is possible to predict an overall balance of one moving image without viewing the moving image.

Figure 11:
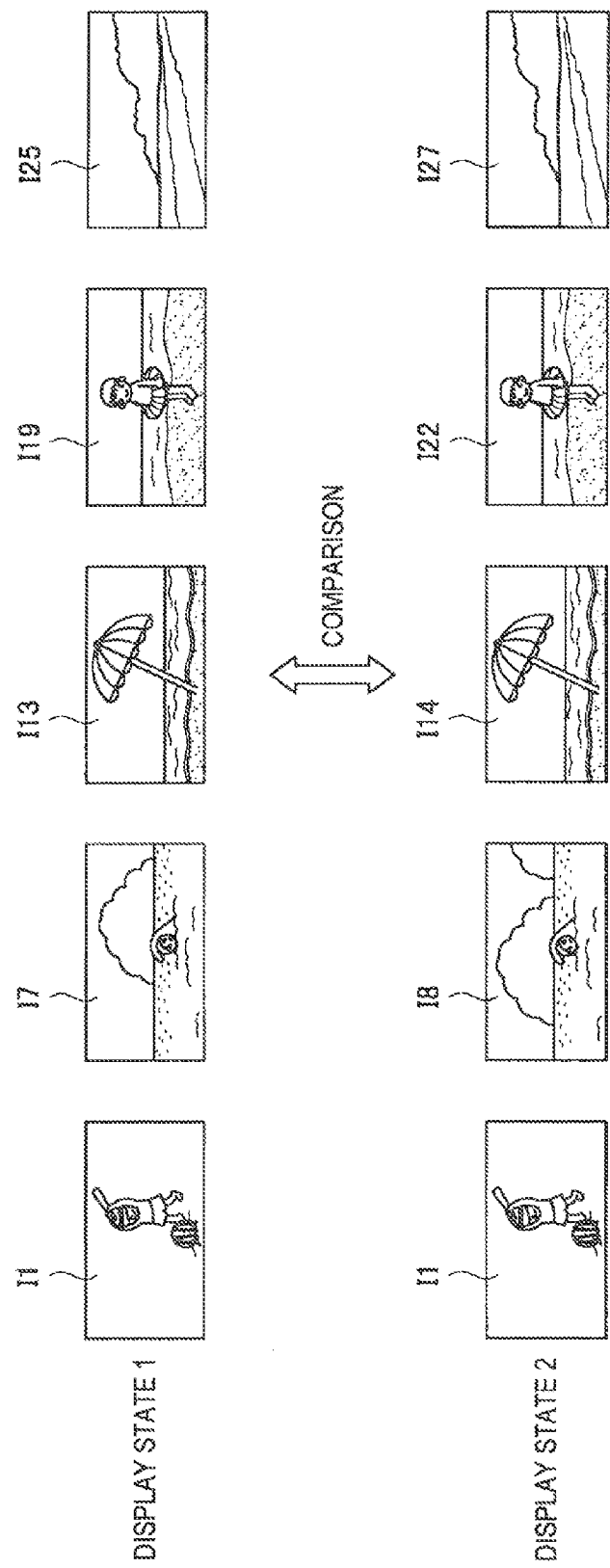
FIG. 11 is a diagram for explaining a comparative example.

Herein, the embodiment is described more in detail in comparison with a comparative example illustrated in FIG. 11. FIG. 11 is a diagram for explaining a comparative example for the comparison of two display states 1 and 2 displaying a plurality of the representative frames. In addition, in the two display states 1 and 2, no implicative images are displayed. In the display state 1, among 30 frames illustrated in FIG. 3, the first frame I1, the seventh frame I7, the 13th frame I13, the 19th frame I19, and the 25th frame I25 are indicated as the representative frames. In the display state 2, the first frame I1, the eighth frame I8, the 14th frame I14, the 22nd frame I22, and the 27th frame I27 are indicated as the representative frames.

If the display state 1 and the display state 2 are compared, a user may misunderstand that the upper and lower frames are the same frames. As understood from FIG. 11, for example, the frame I7 and the frame I8 are not significantly different from each other, and the frame I19 and the frame I22 are not significantly different from each other. Therefore, the user may misunderstand that the display state 1 and the display state 2 are the same.

On the contrary, according to the aforementioned moving image processing apparatuses 10 and 40, the implicative images are displayed between a plurality of the representative frames, the user may recognize the time elapsed between the plurality of the representative frames. Particularly, in the case where the time intervals between the plurality of the representative frames are not equal, the effectiveness is increased more. In this manner, in the embodiment, a plurality of the representative frames are not treated as a simple bundle of still images, but the display thereof is made by considering the time sequence thereof.

2. Second Embodiment

Figure 12:
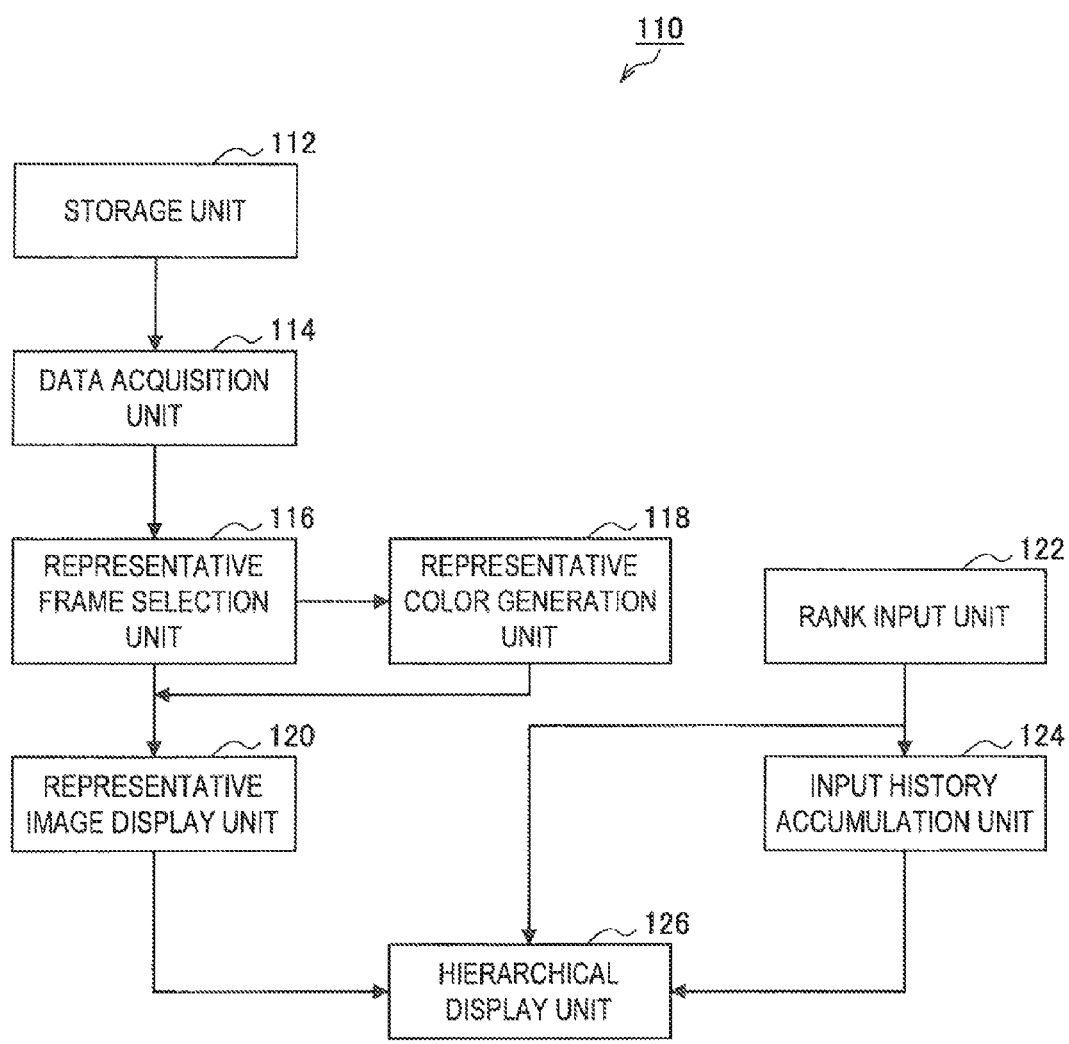
FIG. 12 a block diagram illustrating the configuration of a moving image processing apparatus according to a second embodiment.

2-1. Configuration of Moving Image Processing Apparatus According to Second Embodiment An example of a moving image processing apparatus 110 according to a second embodiment will be described with reference to FIG. 12. FIG. 12 is a block diagram illustrating the configuration of the moving image processing apparatus 110 according to the second embodiment.

The aforementioned moving image processing apparatus 10 is configured to generate the representative features (implicative images) of the frames other than the representative frames and display a plurality of the representative frames and a plurality of the implicative images on the display screen. On the contrary, in the moving image processing apparatus 110, the number of representative frames displayed on the display screen may be changed according to display ranks thereof. In addition, according to the change in the number of the displayed representative frames, the display of the implicative images is also changed.

As illustrated in FIG. 12, the moving image processing apparatus 110 includes a storage unit 112, a data acquisition unit 114, a frame selection unit 116, a representative feature generation unit 118, a representative image display unit 120, a rank input unit 122 which is an example of a rank designation unit, an input history accumulation unit 124, and a hierarchical display unit 126. In addition, in the second embodiment, the representative image display unit 120 and the hierarchical display unit 126 correspond to a display controller.

The storage unit 112, the data acquisition unit 114, the frame selection unit 116, the representative feature generation unit 118, and the representative image display unit 120 are the same as the storage unit 12, the data acquisition unit 14, the frame selection unit 16, the representative feature generation unit 18, and the representative image display unit 20 illustrated in FIG. 1, respectively. Therefore, a detailed description of the configuration thereof is not repeated.

The rank input unit 122 designates a display rank to a representative frame. For example, a rank 1, a rank 2, a rank 3, or the like is designated as the display rank. Rank 1 is a lower rank, and rank 3 is an upper rank.

The input history accumulation unit 124 stores an input history of the rank input unit 122. For example, the input history accumulation unit 124 stores the display ranks previously designated to one representative frame or the updated display ranks thereof. In addition, the input history accumulation unit 124 may also store a frequency of updating the display ranks.

The hierarchical display unit 126 performs hierarchical display of representative images according to the designated display ranks. In other words, the hierarchical display unit 126 changes the number of representative frames displayed as representative images according to the designated display ranks. More specifically, the hierarchical display unit 126 displays the representative frames of which the rank is a rank of 2 or higher or displays only the representative frames of which the rank is a rank of 3 or higher among a plurality of the representative frames where the ranks 1 to 3 are mixed according to the user's manipulation (a display rank changing manipulation).

In addition, the hierarchical display unit 126 performs the hierarchical display of the representative images with reference to the input history stored in the input history accumulation unit 124. For example, in the case where there are a plurality of the representative frames having the same display rank, the representative frame of which the frequency of updating the display rank is large is preferentially displayed on the display screen; with reference to the input history. This is effective in the case where the size of the display screen is limited so that the number of representative frames which can be displayed is limited.

2-2. Hierarchical Display of Representative Images

Figure 13:
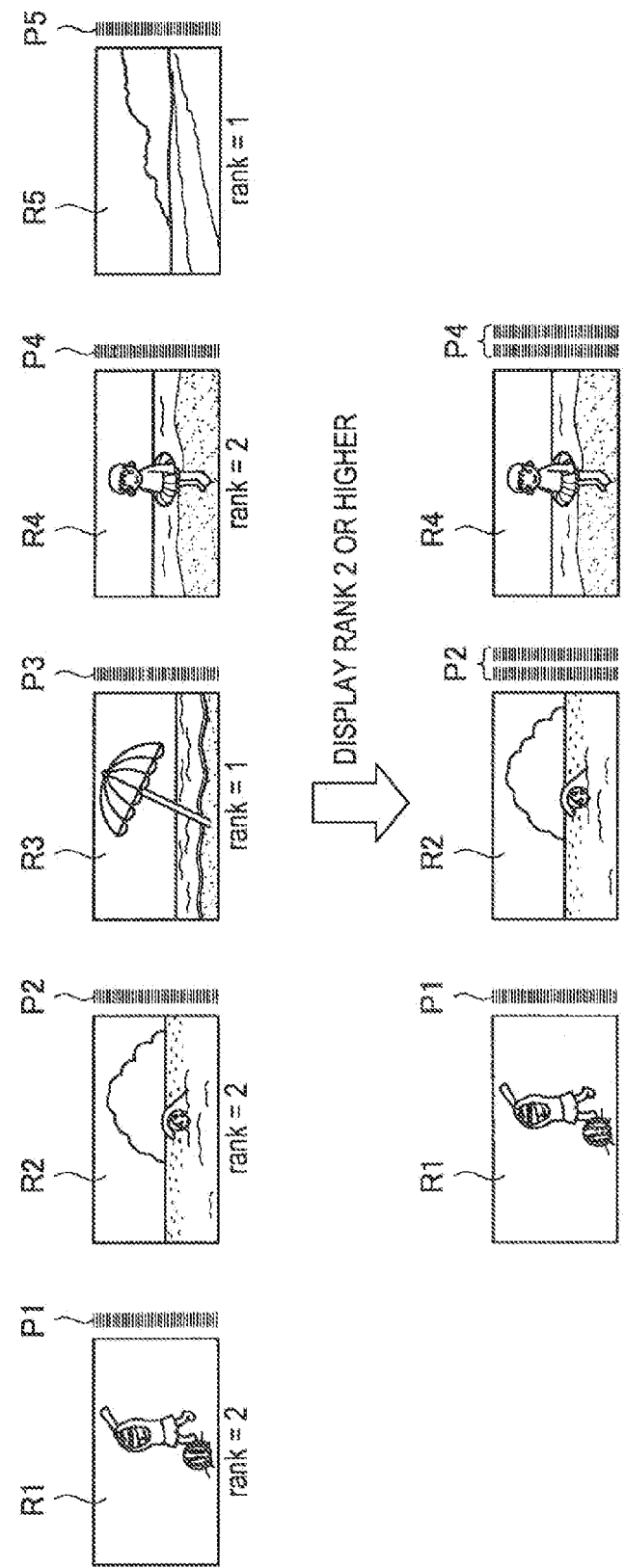
FIG. 13 is a diagram for explaining an example of a hierarchical display of representative images.

An example of a hierarchical display of the representative images is described with reference to FIG. 13. FIG. 13 is a diagram for explaining an example of a hierarchical display of the representative images.

In FIG. 13, a plurality of representative frames R1 to R5 and a plurality of the implicative images P1 to P5 are displayed. The plurality of the representative frames R1 to R5 are designated with display ranks. More specifically, the display ranks of the representative frames R1 and R2 are designated a rank of 2; the display rank of the representative frames R3 is designated a rank of 1; the display rank of the representative frames R4 is designated a rank of 2; and the display rank of the representative frames R5 is designated a rank of 1. In addition, the non-selected frame which is not a representative frame in the frame group is designated with a rank of 0.

In this case, if a user performs a manipulation of displaying the representative frames of which the display rank is a rank of 2 or higher, the representative frames R1, the representative frames R2, the representative frames R4 of which the display rank is a rank of 2 or higher are displayed among the five representative frames R1 to R5.

In addition, according to the display of the representative frames of which the display rank is a rank of 2 or higher, the display of the implicative images P1 to P5 is also changed. In other words, the non-selected frame between the representative frames R2 and the representative frames R4 and the segment images of the representative frame R3 are displayed as the implicative image P2. In addition, the non-selected frame after the representative frame R4 and the segment images of the representative frame R5 are displayed as the implicative image P4. If the number of the representative frames displayed is decreased due to the hierarchical display, the lengths of the implicative images are increased (the number of the segment images of each implicative image is increased).

The example of a hierarchical display of the representative images is not limited to the display example illustrated in FIG. 13. The display examples illustrated in FIGS. 14 to 16 described hereinafter may be used. Hereinafter, other display examples of hierarchical display will be described with reference to FIGS. 14 to 16. In addition, similarly to FIG. 13, in FIGS. 14 to 16, displayed are the representative frames R1, R2, and R4 of which the display rank is a rank of 2 or higher.

Figure 14:
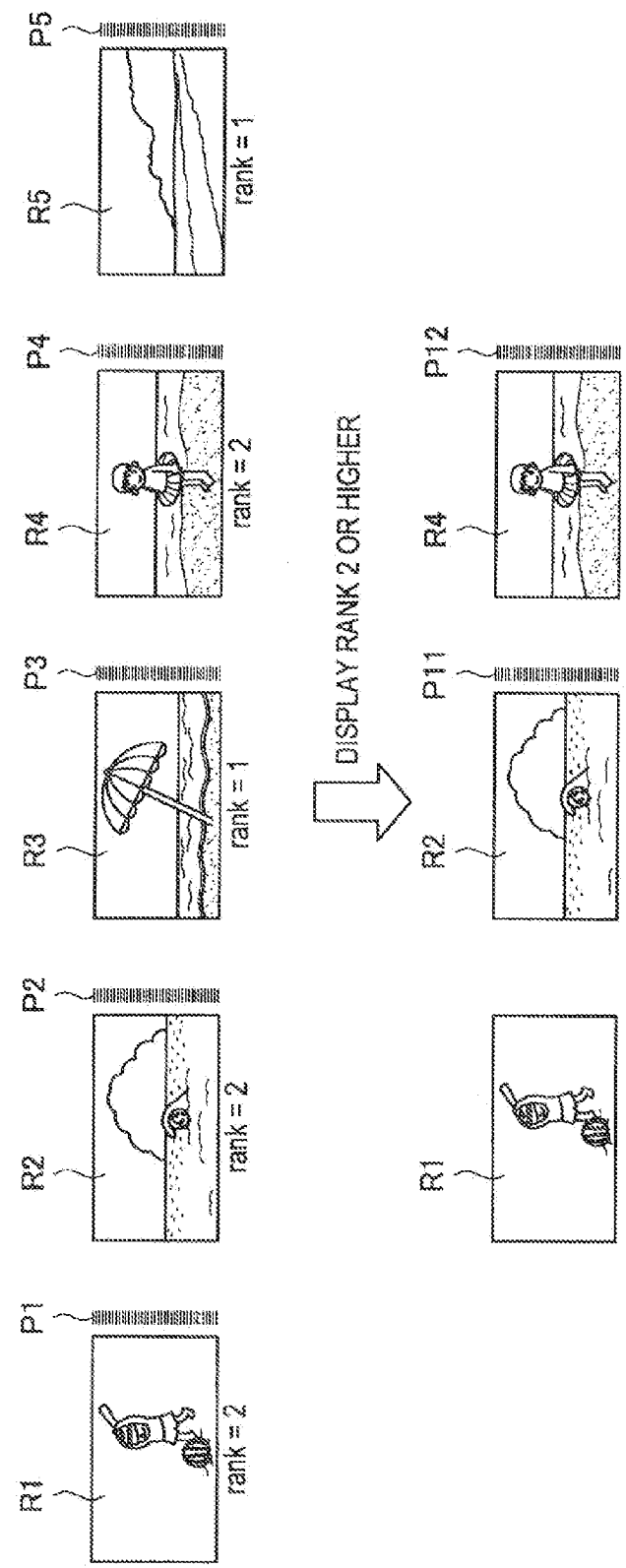
FIG. 14 is a diagram for explaining another example of a hierarchical display of representative images.

FIG. 14 is a diagram for explaining another example of hierarchical display of representative images. The display example is different from that of FIG. 13 in terms of an implicative image displaying method. In FIG. 13, the non-selected frames which are not a representative frame are displayed as an implicative image. On the contrary, in FIG. 14, the implicative image of the frame which is not a representative frame is not displayed while the implicative image P11 indicating the representative frame R3 having a rank of 1 and the implicative image P12 indicating the representative frame R5 are displayed. In addition, a plurality of the segment images constituting the implicative images P11 and P12 are the images indicating, for example, the color information of each of the representative frames R3 and R5.

In this case, when a representative frame having an upper display rank is displayed, a user may easily recognize the existence of a representative frame having a lower display rank. Therefore, the user may easily display the representative frame having the lower display rank again.

Figure 15:
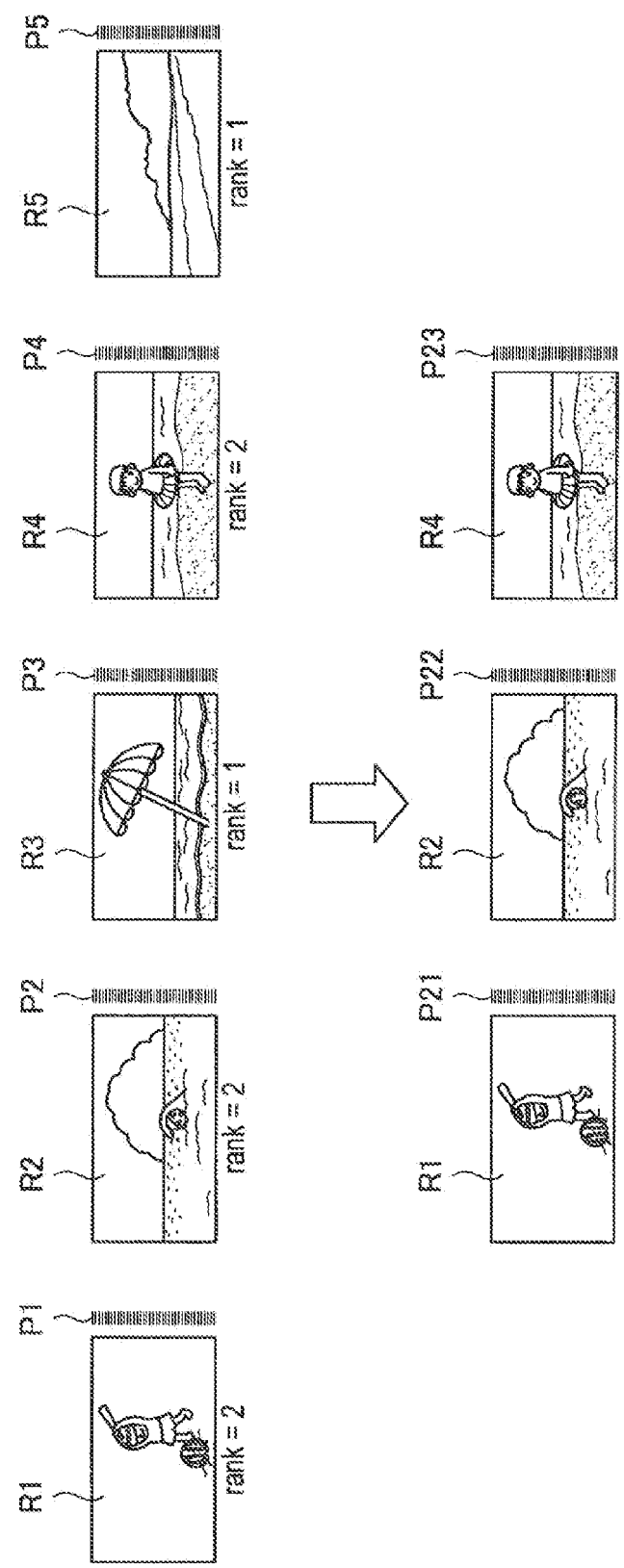
FIG. 15 is a diagram for explaining still another example of a hierarchical display of representative images.

FIG. 15 is a diagram for explaining still another example of a hierarchical display of the representative images. The display example of FIG. 15 is different from that of FIG. 13 in terms of an implicative image displaying method. In FIG. 13, the displayed lengths of the implicative images P1, P2, and P4 are different from each other. On the contrary, in FIG. 15, the displayed lengths of the implicative images P21, P22, and P23 are equal to each other. Although the implicative image P21 is the same as the implicative image P1 of FIG. 13, the implicative images P22 and P23 become images formed by compressing the lengths of the implicative images P2 and P4 of FIG. 13 (images of which the number of the segment images is reduced).

Figure 16:
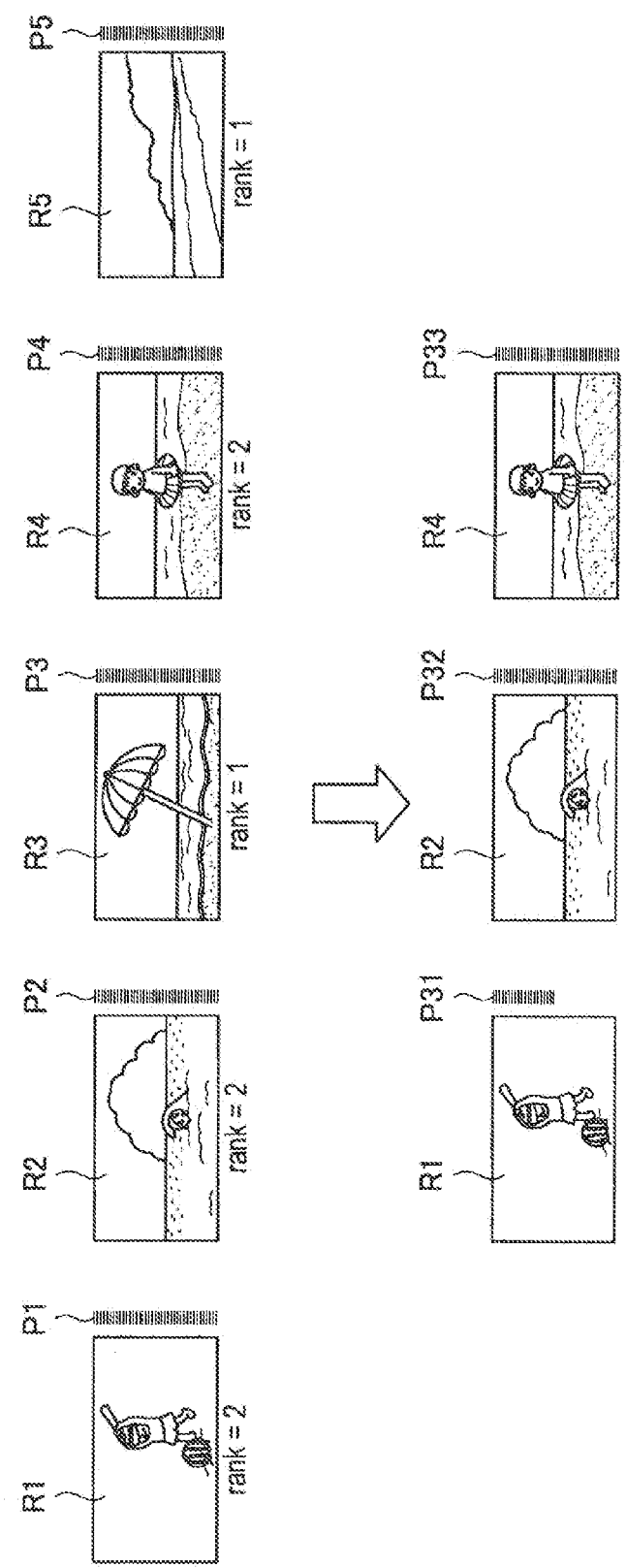
FIG. 16 is a diagram for explaining further still another example of a hierarchical display of representative images.

FIG. 16 is a diagram for explaining further still another example of a hierarchical display of the representative images. The display example of FIG. 16 is different from that of FIG. 13 in terms of an implicative image displaying method. The implicative images P31, P32, and P33 of FIG. 16 are formed by compressing the lengths of the implicative images P1, P2, and P4 of FIG. 13 at the same ratio (by reducing the number of the segment images by half), and each of the implicative images P31, P32, and P33 becomes rectangular.

In the case of the display examples of FIGS. 15 and 16, it is possible to prevent the implicative images from being increased in comparison with, for example, the display example of FIG. 13, so that it is possible to effectively use the displayed size of the display screen. Therefore, it is also possible to increase the number of displayed representative frames.

Figure 17:
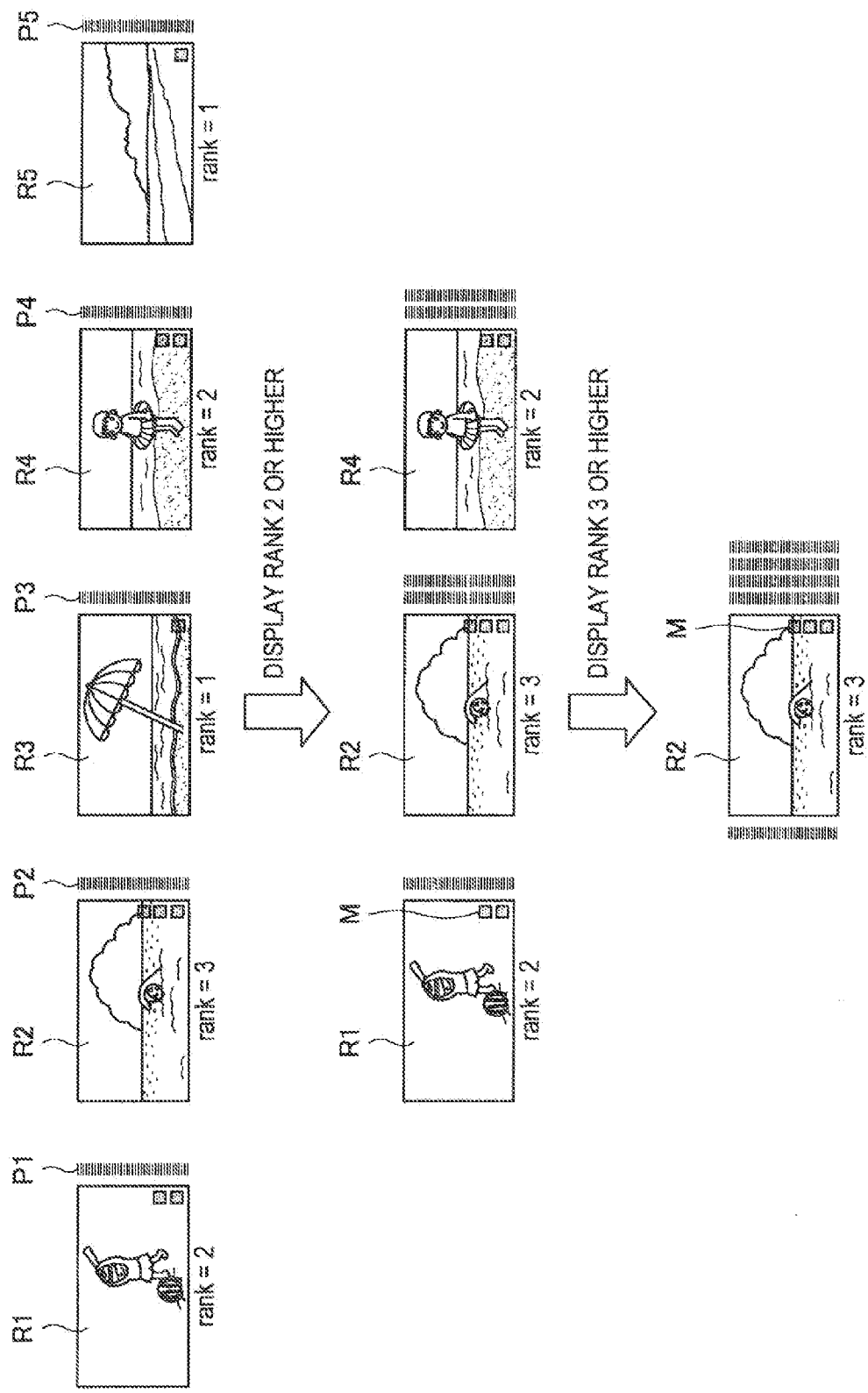
FIG. 17 is a diagram for explaining yet further still another example of a hierarchical display of representative images.

FIG. 17 is a diagram for explaining yet further still another example of a hierarchical display of the representative images. In FIG. 17, a display rank of each representative frame is displayed as marks in the representative frame. In other words, rectangular marks M are displayed in an overlapped manner at the lower right portion of each representative frames, and the number of the rectangular marks M indicates the display rank. For example, the representative frame R1 having a rank of 2 includes two rectangular marks; the representative frame R2 having a rank of 3 includes three rectangular marks; and the representative frame R3 having a rank of 1 includes one rectangular mark. Therefore, the user may easily recognize the display rank of the representative frame by counting the number of marks.

Figure 18:
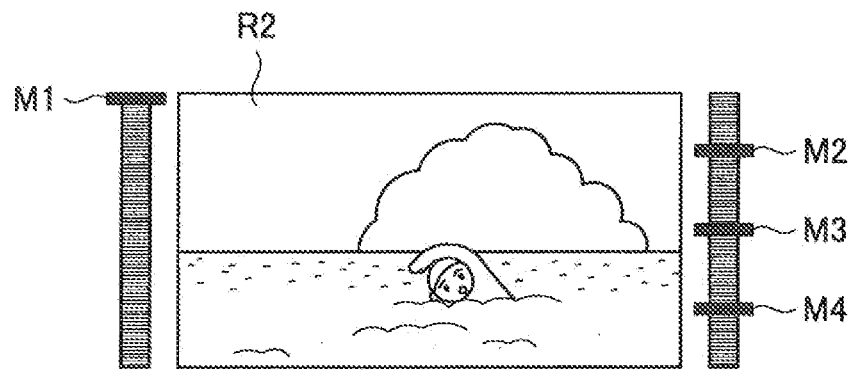
FIG. 18 is a diagram for explaining marks indicating positions of representative frames having lower display ranks among implicative images.
Figure 19:
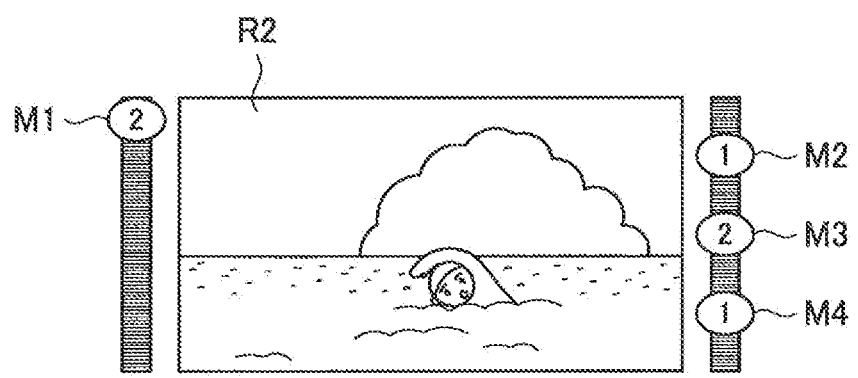
FIG. 19 is another diagram for explaining marks indicating positions of representative frames having lower display ranks among implicative images.

FIGS. 18 and 19 are diagrams for explaining marks indicating positions of the representative frames having lower display ranks among implicative images. In FIGS. 18 and 19, the representative frame R2 having a display rank of 3 is displayed, and the positions of the representative frames having a display rank of 2 or lower are displayed in the implicative images as marks. More specifically, the positions of the representative frames R1, R3, R4, and R5 having a rank of 2 are displayed as the marks M1, M2, M3, and M4 in an overlapped manner in each of the implicative images, respectively.

In addition, in FIG. 18, the positions of the representative frames are displayed so that the widths of the marks M1 to M4 are enlarged. In FIG. 19, the numbers indicating ranks in the marks M1 to M4 are displayed. Therefore, the user easily identifies the positions of the representative frames having lower display ranks when a representative frame having an upper display rank is displayed.

2-3. Operations of the Moving Image Processing Apparatus According to the Second Embodiment Next, an example of operations (moving image processing method) of the moving image processing apparatus 110, which are performed at the time of performing a hierarchical display of the representative frames, is described with reference to FIG. 20. FIG. 20 is a flowchart for explaining an example of the operations of the moving image processing apparatus 110 according to the second embodiment.

First, the moving image processing apparatus 110 acquires moving image data from the storage unit 112 (Step S42). Next, the moving image processing apparatus 110 selects representative frames from the frame group constituting the moving image data and generates the representative features of the images with respect to frames which are not selected.

Next, the moving image processing apparatus 110 controls displaying the frames in the configuring order of the frame group. The moving image processing apparatus 110 determines whether or not the first frame is a representative frame (Step S44). In the case where the first frame is a representative frame (Yes in Step S44), the moving image processing apparatus 110 determines whether the display rank of the first frame is equal to or higher than a predetermined display rank (Step S46). In the case where the display rank of the first frame is equal to or higher than a predetermined display rank (Yes in Step S46), the moving image processing apparatus 110 displays the representative frame on the display screen 30 (Step S48).

On the other hand, in the case where the first frame is not a representative frame in Step S44, the moving image processing apparatus 110 displays the representative feature of the frame image (Step S50). In addition, in the case where the display rank of the first frame is lower than a predetermined display rank in Step S46, the moving image processing apparatus 110 displays the representative feature of the frame image (Step S50).

Next, the moving image processing apparatus 110 determines whether or not the to-be-displayed frame is the last frame (Step S52). In the case where the to-be-displayed frame is the last frame (Yes in Step S52), the process is ended. On the other hand, in the case where the to-be-displayed frame is not the last frame (No in Step S52), the aforementioned Steps S44 to S50 are repeated. Accordingly, as illustrated in FIGS. 13 to 19, the representative frames and the implicative images are displayed in a hierarchical manner on the display screen 30.

2-4. Conclusions

Similarly to the first embodiment, according to the second embodiment, with respect to the data of one moving image, a plurality of the representative frames are displayed, and the implicative images are generated and displayed with respect to the frames which are not the representative frames, so that it is possible to display much more information on the display screen. In addition, since a user may recognize the time elapsed between a plurality of the representative frames, it is possible to more appropriately check contents of the moving image.

In addition, in the second embodiment, the representative frames are designated with the display ranks, and the display is controlled according to the display ranks, so that it is possible to more easily check the entire moving image.

3. Other Embodiments

It should be understood by those skilled in the art that various modifications, combinations, sub-combinations and alterations may occur depending on design requirements and other factors insofar as they are within the scope of the appended claims or the equivalents thereof.

In some of the embodiments described above, the representative frames and the implicative images are additional information associated with the moving image that can be stored on a non-transitory computer readable storage medium such as a compact disk (CD), digital video disk (DVD), hard disk drive (HDD) or other such media. The additional information can be displayed on a user's display system in response to a control signal provided by the user or provided from a remote system or server to the user's display system.

In some embodiments, the representative frames and the implicative images are additional information associated with the moving image wherein the moving image and the additional information are provided from separate sources. That is, the moving image and the additional information are stored separately from one another. For example, the moving image may be provided either wired or wirelessly from a first server coupled to a user's display system and the additional information provided from a second server. Alternatively, the moving image may be stored on a non-transitory storage medium and the additional information provided wired or wirelessly from a server coupled to the user's display system.

In some embodiments, the additional information is volatile. That is, the additional information is available for display on a user's display unit for a predetermined length of time. For example, the additional information may be available for display only while the moving image is being displayed for the first time. Alternatively, the additional information may be stored on the user's display unit for a predetermined period of time after which the additional information is erased. Other methods of volatile storage of the additional data are known and contemplated to be within the scope of this disclosure.

In the embodiments described above, although the search screen is exemplified as the display screen where the representative images are displayed, the present disclosure is not limited thereto. For example, the display screen may be a viewing screen for viewing the moving image, an editing screen for editing the moving image, or the like.

In addition, although a series of the processes described in the aforementioned embodiments may be executed by dedicated hardware, the processes may also be executed by software (applications). In the case where a series of the processes are executed by software, a series of the processes may be embodied on a non-transitory computer readable medium such as a compact disk (CD), digital video disk (DVD), hard disk drive (HDD) or other such media to allow a general purpose computer or a dedicated computer to execute the program.

In addition, the steps illustrated in the flowchart of the aforementioned embodiments may include not only the process which is performed in a time sequence manner according to the order described but also the processes which are performed not necessarily in a time sequence manner but in a parallel manner or in an separate manner. In addition, even in the case of the steps that are performed in a time sequence manner, it is obvious that, sometimes, the sequence may be appropriately changed.

For example, the present technology can adopt the following configurations.

(1) A moving image processing apparatus comprising:
a representative frame selection unit which selects a plurality of representative frames representing one moving image from a frame group constituting the moving image;
an implicative image generation unit which generates an implicative image implying one of at least color information and luminance information of a frame image with respect to each of non-selected frames which are not selected as the representative frames among the frame group; and
a display controller which displays the implicative images generated by the implicative image generation unit to be adjacent to the representative frames when the representative frames selected by the representative frame selection unit are displayed.

(2) The moving image processing apparatus according to the (1),
wherein the display controller displays segment images indicated by segments as the implicative image to be adjacent to the representative frames.

(3) The moving image processing apparatus according to the (2),
wherein the display controller performs the display so that the segment images corresponding to each of a plurality of the non-selected frames are arranged in a configuring order of the plurality of the non-selected frames in the frame group.

(4) The moving image processing apparatus according to the (3),
wherein when a plurality of the representative frames is displayed, the display controller performs the display so that the number of the segment images which are adjacent to one representative frame is different from the number of the segment images which are adjacent to the other representative frame.

(5) The moving image processing apparatus according to any one of the (1) to (4),
wherein the display controller displays a plurality of the representative frames so as to be separated from each other in a predetermined arrangement direction, and wherein the display controller displays the implicative image corresponding to the non-selected frame located between the two representative frames in the configuring order of the frame group so as to be disposed between the two representative frames in the arrangement direction.

(6) The moving image processing apparatus according to any one of the (1) to (5),
wherein when one non-selected frame is divided into a plurality of areas, the implicative image generation unit generates the implicative images configured to include a plurality of implicative portions corresponding to each of the areas.

(7) The moving image processing apparatus according to any one of the (1) to (6),
wherein the representative frame selection unit selects a plurality of the representative frames of which the interval is equal in a configuring order of the frame group.

(8) The moving image processing apparatus according to any one of the (1) to (7),
wherein the representative frame selection unit selects a plurality of the representative frames of which the interval is not equal in a configuring order of the frame group.

(9) The moving image processing apparatus according to any one of the (1) to (8), further comprising:
a rank designation unit which designates a display rank to each of the plurality of representative frames,
wherein the display controller displays the representative frames of which the display ranks are designated to be a predetermined display rank or higher among the selected plurality of representative frames but does not display the representative frames of which the designated display ranks are lower than the predetermined display rank.

(10) The moving image processing apparatus according to the (9),
wherein the display controller displays the position information indicating the positions of the representative frames in a configuring order of the moving image, of which the display ranks are designated to be lower than the predetermined display rank, on the implicative image in an overlapped manner.

(11) A moving image processing method comprising:
selecting a plurality of representative frames representing one moving image from a frame group constituting the moving image;
generating an implicative image implying one of at least color information and luminance information of a frame image with respect to each of non-selected frames which are not selected as the representative frames among the frame group; and
displaying the generated implicative images to be adjacent to the representative frames when the selected representative frames are displayed.

(12) A program for allowing a computer, to execute:
selecting a plurality of representative frames representing one moving image from a frame group constituting the moving image;

generating an implicative image implying one of at least color information and luminance information of a frame image with respect to each of non-selected frames which are not selected as the representative frames among the frame group; and displaying the generated implicative images to be adjacent to the representative frames when the selected representative frames are displayed.

The present disclosure contains subject matter related to that disclosed in Japanese Priority Patent Application JP 2011-024867 filed in the Japan Patent Office on Feb. 8, 2011, the entire content of which is hereby incorporated by reference. Other embodiments are within the scope of the following claims.

What is claimed is:

1. A moving image display processing apparatus, comprising:
a frame selection unit configured to automatically select a plurality of representative frames from a moving image comprised of frames, each representative frame being a still image representing a group of sequential frames;
a generation unit configured to automatically generate one or more implicative images associated with at least one frame in the group of sequential frames other than the representative frame, the implicative image being a representative feature of non-selected frames in the moving image intermediary between two successive representative frames; and
a display control unit configured to display on a display the plurality of representative frames by arranging the plurality of representative frames in a predetermined sequence such that a first representative frame is separated from a second successive representative frame by one or more implicative images, and to display on the display the implicative images,
wherein a number of implicative images associated with each representative image is displayed on the display adjacent the respective representative image.

2. The moving image display processing apparatus of claim 1, wherein a number of implicative images between each representative frame is equal.

3. The moving image display processing apparatus of claim 1, wherein the number of implicative images between at least two representative frames is not equal to the number of implicative frames between two other representative frames.

4. The moving image display processing apparatus of claim 1, wherein each implicative image is a line.

5. The moving image display processing apparatus of claim 1, wherein the implicative image is a size-reduced image of a corresponding frame.

6. The moving image display processing apparatus of claim 1, wherein the implicative image is generated based on at least one of color information and luminance information of a corresponding frame.

7. The moving image display processing apparatus of claim 1, wherein the implicative image is not rectangular.

8. The moving image display processing apparatus of claim 7,
wherein each representative image has an associated hierarchical order,
wherein the display control unit displays selected representative images at or above a specified hierarchical order and the display control unit does not display the representative images below the specified hierarchical order, and
wherein the implicative images include representative images below the specified hierarchical order and implicative images between selected representative images.

9. A moving image display processing method, comprising:
automatically selecting a plurality of representative frames from a moving image comprised of frames, each representative frame being a still image representing a group of sequential frames;
automatically generating one or more implicative images associated with at least one frame in the group of sequential frames other than the representative frame, the implicative image being a representative feature of non-selected frames in the moving image intermediary between two successive representative frames; and
causing the plurality of representative frames to be displayed on a display by arranging the plurality of representative frames in a predetermined sequence such that a first representative frame is separated from a second representative frame by implicative images,
displaying the implicative images on the display,
wherein a number of implicative images associated with each representative image is displayed on the display adjacent the respective representative image.

10. A non-transitory computer-readable storage medium having stored there on a program for causing a computer to perform a moving image display processing method, comprising:
selecting a plurality of representative frames from a moving image comprised of frames, each representative frame being a still image representing a group of sequential frames;
generating one or more implicative images associated with at least one frame in the group of sequential frames other than the representative frame, the implicative image being a representative feature of non-selected frames in the moving image intermediary between two successive representative frames; and
causing the plurality of representative frames to be displayed on a display by arranging the plurality of representative frames in a predetermined sequence such that a first representative frame is separated from a second representative frame by implicative images,
displaying the implicative images on the display
wherein a number of implicative images associated with each representative image is displayed on the display adjacent the respective representative image.

11. A moving image display method, comprising:
receiving a moving image comprised of frames;
displaying the moving image on a display;
receiving additional information associated with the moving image;
displaying the additional information on the display,
wherein the additional information is received after the moving image has been received,
wherein the additional information is a plurality of representative frames from the moving image, each representative frame being a still image representing a group of sequential frames, and an implicative image associated with at least one frame in the group of sequential frames other than the representative frame, the implicative image being a representative feature of non-selected frames in the moving image intermediary between two successive representative frames, and
wherein displaying the additional information includes displaying a plurality of representative frames in a predetermined sequence such that implicative images are displayed between a first representative frame and a successive representative frame.

12. The moving image display method of claim 11, wherein the moving image and the additional information are received from different information providers.

13. A moving image display system, comprising:
a non-trans transitory storage medium having stored thereon a moving image comprised of frames;
a display control unit configured to display the moving image on a display; and
a representative image selector configured to receive additional information associated with the moving image and not stored on the non-transitory storage medium, and cause the display control unit to display the received associated information,
wherein the additional information is a plurality of representative frames from the moving image, each representative frame being a still image representing a group of sequential frames, and an implicative image associated with at least one frame in the group of sequential frames other than the representative frame, the implicative image being representative of non-selected frames in the moving image intermediary between two successive representative frames, and
wherein displaying the additional information includes displaying a plurality of representative frames in a predetermined sequence such that implicative images are displayed between a first representative frame and a successive representative frame.

14. The moving image display method of claim 13, wherein the received additional information is available for display on the display control unit for a predetermined period of time.

15. A moving image display system, comprising:
a non-transitory storage medium having stored thereon (i) a moving image comprised of frames, (ii) a plurality of representative frames from the moving image, each representative frame being a still image representing a group of sequential frames, and (iii) an implicative image associated with at least one frame in the group of sequential frames other than the representative frame, the implicative images being representative of non-selected frames in the moving image intermediary between two successive representative frames;
a display control unit configured to display the moving image; and
a representative image selector configured to receive a control signal and in response to cause the display control unit to display a plurality of representative frames in a predetermined sequence such that a first representative frame is separated from a successive representative frame by a display of implicative images.

* * * * *